United States Patent [19]

Stemme

[11] Patent Number: 5,743,489
[45] Date of Patent: Apr. 28, 1998

[54] AIRCRAFT WITH TWO ALTERNATINGLY OPERATED PROPELLERS OF DIFFERENT RADIUS

[75] Inventor: Reiner Stemme, Berlin, Germany

[73] Assignee: Stemme GmbH & Co. KG, Berlin, Germany

[21] Appl. No.: 469,004

[22] Filed: Jun. 5, 1995

[30] Foreign Application Priority Data

Jun. 6, 1994 [DE] Germany .......................... 44 20 219.9

[51] Int. Cl.⁶ .................................................. B64C 39/00
[52] U.S. Cl. ............................ 244/62; 244/59; 244/65; 416/129; 416/87
[58] Field of Search .................................. 244/62, 59, 65, 244/66, 6, 7 R, 7 B, 69; 416/128, 129, 124, 201 A, 87

[56] References Cited

U.S. PATENT DOCUMENTS

| | | | |
|---|---|---|---|
| 1,771,654 | 7/1930 | Powell | 416/124 |
| 2,604,276 | 7/1952 | Huben | 244/62 |
| 2,979,288 | 4/1961 | Klein | 244/55 |
| 3,586,262 | 6/1971 | Sherman | 244/7 R |
| 4,842,484 | 6/1989 | Johnson | |

FOREIGN PATENT DOCUMENTS

| | | | |
|---|---|---|---|
| 1005200 | 4/1952 | France | |
| 2446463 | 4/1976 | Germany | 416/87 |
| 41 19 810 | 12/1992 | Germany | |

*Primary Examiner*—Andres Kashnikow
*Assistant Examiner*—Tien Dinh
*Attorney, Agent, or Firm*—Spencer & Frank

[57] ABSTRACT

An aircraft has at least one drive motor coupled to first and second propellers for forward thrust of the aircraft. The first propeller is dimensioned for takeoff and landing conditions and for flight conditions below a predetermined first flight altitude. The second propeller has a radius which is larger than a radius of the first propeller and is dimensioned for a second flight altitude which is substantially greater than the first flight altitude. The two propellers are alternatingly coupled with the at least one drive motor so that the two propellers are respectively individually adapted to the power of the at least one drive motor for a full utilization of the power of the at least one drive motor for forward thrust.

14 Claims, 4 Drawing Sheets

AIRCRAFT WITH TWO ALTERNATINGLY OPERATED PROPELLERS OF DIFFERENT RADIUS

BACKGROUND OF THE INVENTION

The invention relates to an aircraft, in particular a fixed wing aircraft, having at least one drive motor for more than one propeller with the same operative direction.

Aircraft are known having engines which are provided with two coaxially arranged propellers on a common shaft for torque compensation. This principle is used for helicopters, for example, so that a tail rotor can be dispensed with. Turbo-prop engines also use dual propellers which are either both configured as tractor propellers or—in case of front and tail arrangement—as tractor propeller and pusher propeller.

The drawback here is that in the known propeller arrangements having the same operative direction, both propellers must always be operated together. If one of the two propellers allocated to a drive motor were shut down, this would, in most cases, lead to the fact that a stable aircraft flight attitude could not be maintained.

SUMMARY OF THE INVENTION

It is an object of the invention to improve the capacity of an aircraft of the type mentioned in the introduction to adapt to different flight conditions.

The above and other objects are accomplished in the context of an aircraft having at least one drive motor coupled to first and second propellers for forward thrust of the aircraft, wherein according to the invention the first propeller is dimensioned for takeoff and landing conditions and for flight conditions below a predetermined first flight altitude; and the second propeller has a radius which is larger than a radius of the first propeller and is dimensioned for a second flight altitude which is substantially greater than the first flight altitude; and further including means for alternatingly coupling the two propellers with the at least one drive motor so that the two propellers are respectively individually adapted to the power of the at least one drive motor for a full utilization of the power of the at least one drive motor for forward thrust.

The invention is based on the finding that through a selective propulsive connection of propellers which are configured for different flight conditions, an overall more economic flight operation can be achieved than with only a single propeller which can be used equally for all flight phases. Also, a propeller designed for use during the takeoff and landing phase must be limited in its diameter such that it does not also touch the ground when the landing gear makes ground contact. This is an impediment to optimizing the operation at altitudes above 10,000 m—unless extremely high landing gears are provided or the propeller is mounted above the fuselage. The first option leads to extremely large landing gear wells for retractable landing gears, the latter to a trimming of the aircraft with the tendency to lower the nose, which tendency must be compensated for through a constant counteraction of the elevator.

In particular, the blades of the first, smaller propeller are configured so as to be foldable or collapsible such that their maximum extension, starting from their rotary axis, is smaller in a resting position than the corresponding maximum extension in the operating position. Thus, an optimum streamlined shape is ensured for cruising operation.

If the first and/or second propeller is configured with dual blades, it may be stowed optimally or oriented horizontally so that ground contact during the approach phase and during taxiing is excluded, in particular, if the propeller disk of the second propeller in its operating position intersects the plane in which the ground contact points of the landing gear are disposed.

The blades of the second propeller can be fixed in place in feathered pitch, in particular, in a horizontal position, so that only a minor additional drag is present during takeoff and landing as well as during flight in low-level air strata.

If the first propeller relative to the tail of the fuselage or of the engine pod is arranged forward of the second one, favorable stowing options exist for the first propeller, in particular, if the axes of the two propellers are substantially oriented coaxially, the spatial arrangement within the fuselage configuration is also simplified.

Particularly, the speed of the second propeller is geared down by an intermediate gear, with the intermediate gear being a planetary gear.

Preferably, the blades of the first propeller are swingable around axes disposed in the proximity of the rotary axis such that, in a resting position, they do not rise above the adjoining cross section of the fuselage or of the engine pod. Additionally, the swing axes are oriented parallel to the rotational axis during this process.

Advantageously, the blades of the first propeller are held in the resting position by means of springs, with the blades of the first propeller in the operating condition projecting through a closable gap extending in transverse direction over the circumference of the fuselage, with the gap being closable by a nose or tail fairing which is displaceable in or opposite to the flight direction.

It is also advantageous that the second propeller which is present also represents a safety factor.

The invention is described below in greater detail in conjunction with the accompanying drawings.

DETAILED DESCRIPTION OF THE PREFERRED EMBODIMENT

Figure 1:
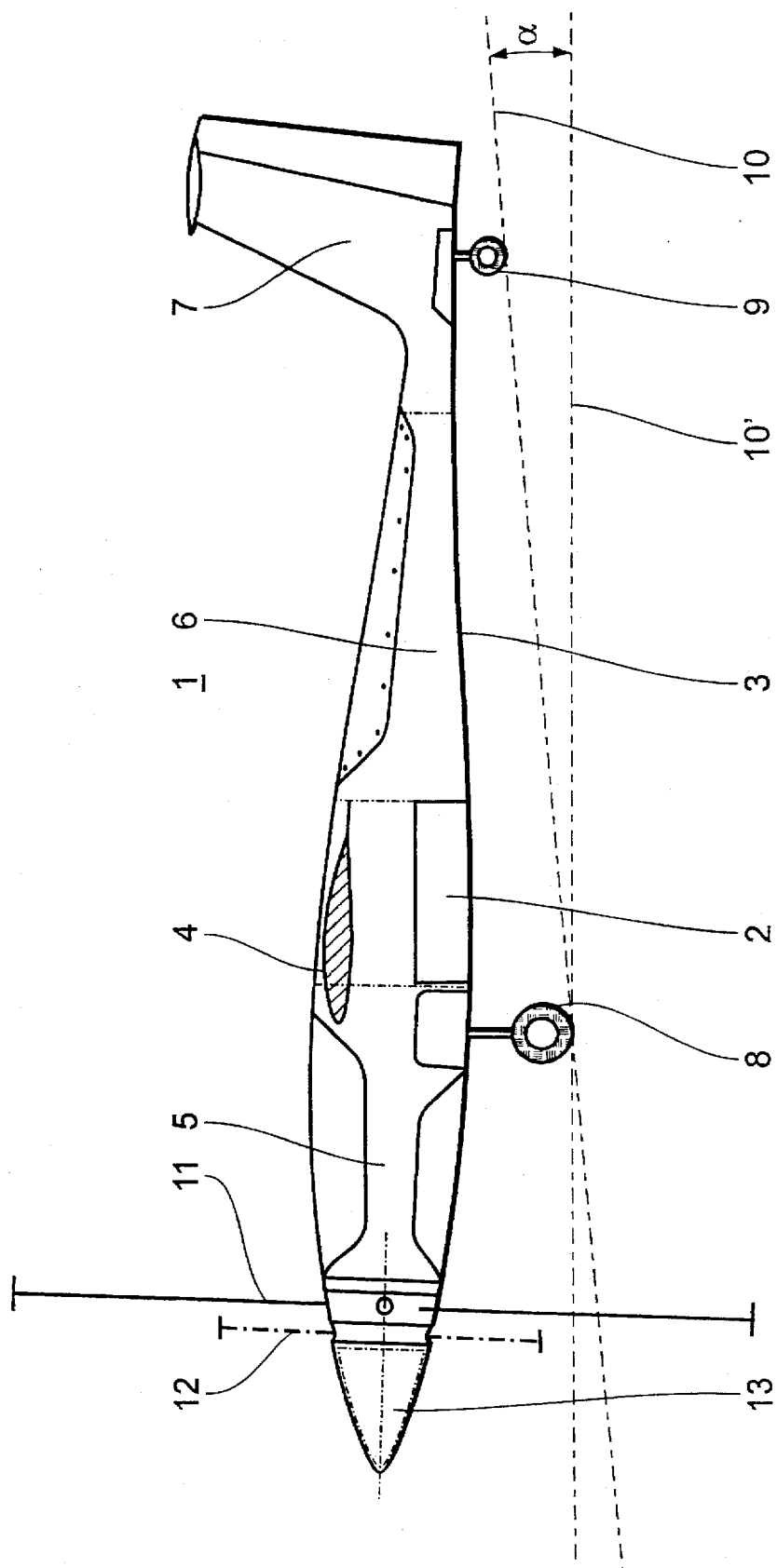
FIG. 1 shows an embodiment of the aircraft according to the invention in a schematic side view.
Figure 2:
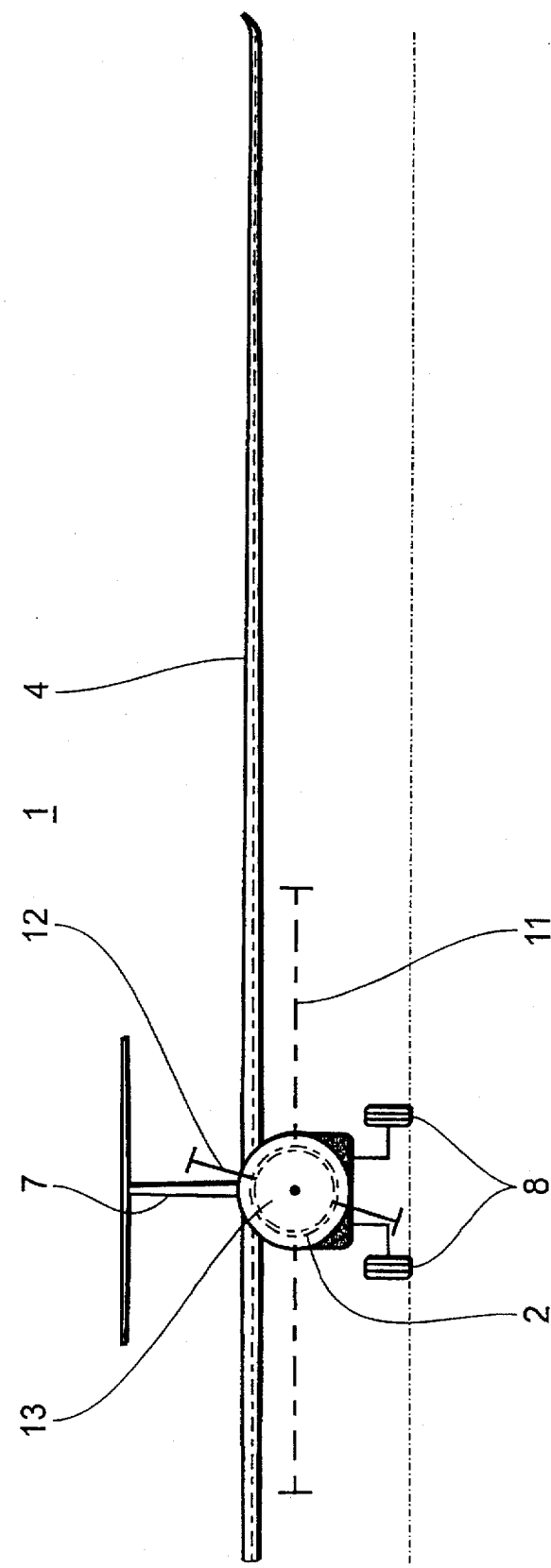
FIG. 2 shows the same embodiment as FIG. 1 in a front view.

FIG. 1 shows the aircraft according to the invention in a schematic side view, while it is shown in front view in FIG. 2. The description below simultaneously refers to these two figures.

The aircraft 1 illustrated in FIG. 1 represents a single-engine business or passenger aircraft which is suitable for a great variety of different commercial purposes—but also as a sporting plane.

A liquid-cooled engine 2 with approximately 125 kW (plus 20% reserve capacity) is centrally provided in the fuselage 3 below the wing 4 which is mounted in "Cantilever" high-wing position. The fuel capacity amounts to approximately 1150 kg, while the payload is 450 kg. The payload can be accommodated in a distributed manner in two fuselage regions 5 and 6, with the pilot seat and possibly the passenger seats being disposed in the front fuselage region 5. The rear fuselage region 6 is preferably available for cargo or for the installation of specialized devices such as aerial cameras, measuring probes and the like. Owing to the illustrated design, fuselage elements respectively may be inserted in variants of a serial type according to a modular system, with these elements being especially configured for the intended application. The fuselage regions concerned are connected by studs.

The tail unit 7 has a T-shaped configuration. The two-wheeled main landing gear 8 is fully retractable, with each wheel being retracted into a separate closable well. The tail wheel is steerable. The ground level in the parked position of the aircraft is indicated by the dash-dot line 10, while line 10' represents the ground level shortly before liftoff of the aircraft. The angle α between both planes is approximately 5°.

The aircraft is designed for large payloads given a small drag. The wings are provided with long span flaps and ailerons at their rearward ends to adapt the supporting air flow to the flight conditions. The fuselage is made of a welded steel tube with CFRP coating. The wings are assembled from three sections and are also made of CFRP.

The engine 2 can be connected alternatingly to two propellers 11 and 12 via gear means—which are described further below. While the blades of propeller 11 are arranged in a stationary manner, the blades of propeller 12—as is also described further below—can be folded inward into a resting position and can be hidden behind the displaceable nose fairing 13. The blades of propeller 11, whose end regions would collide with the ground when in proximity to the ground or during taxiing—as is evident from FIG. 1—are only used at high altitudes starting from 25,000 to 35,000 ft. Otherwise, they assume a horizontally oriented resting position, as is indicated in FIG. 2.

Figure 3:
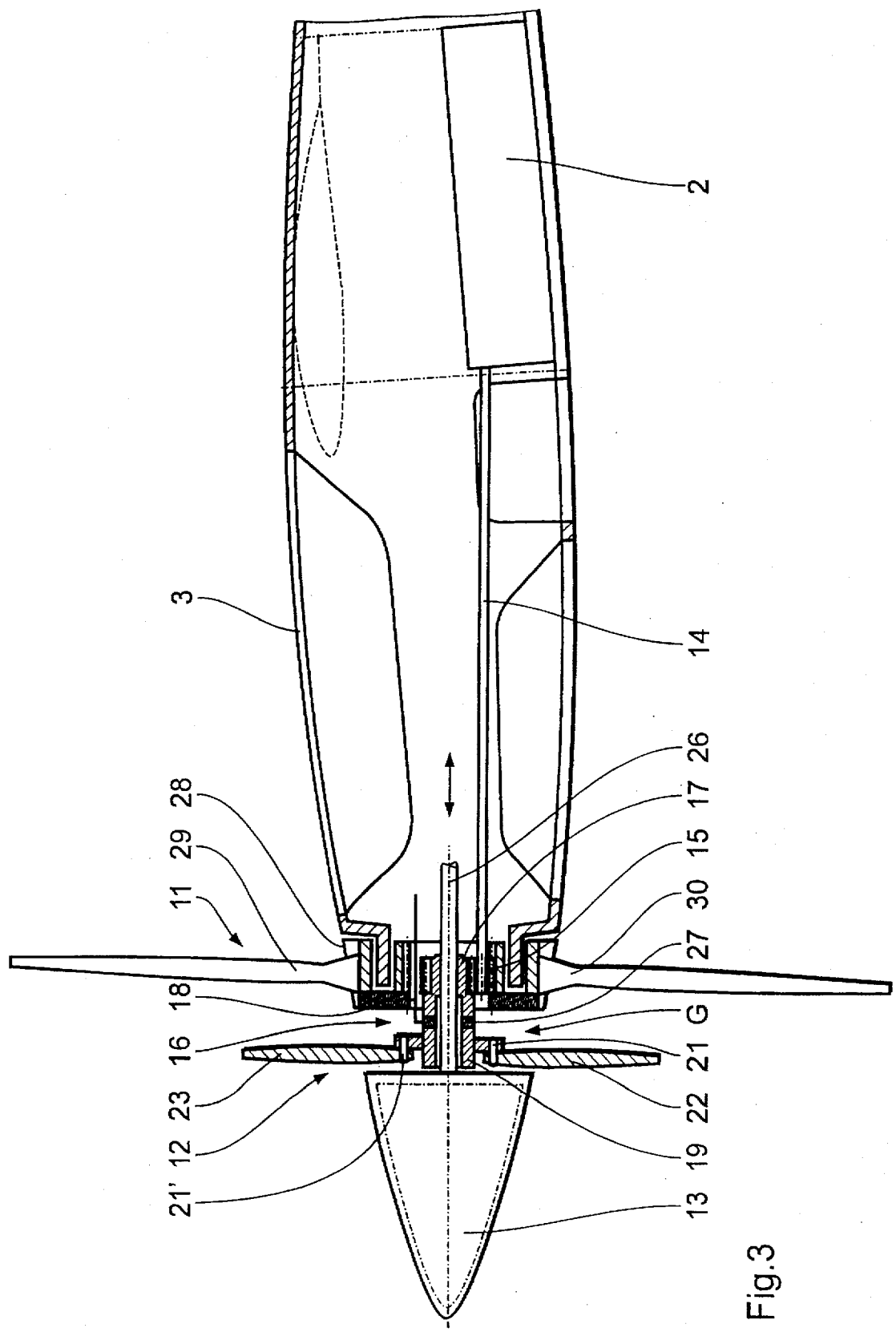
FIG. 3 is a detailed view of a portion of FIG. 1.
Figure 5:
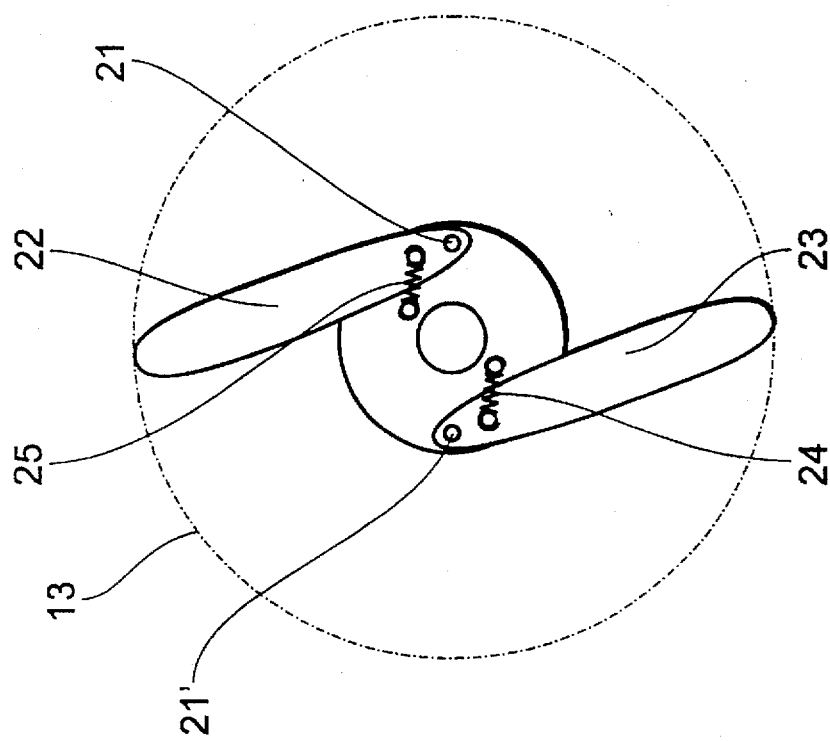
FIGS. 4 and 5 show different detail in two different operating positions of the embodiment of FIG. 1.
Figure 4:
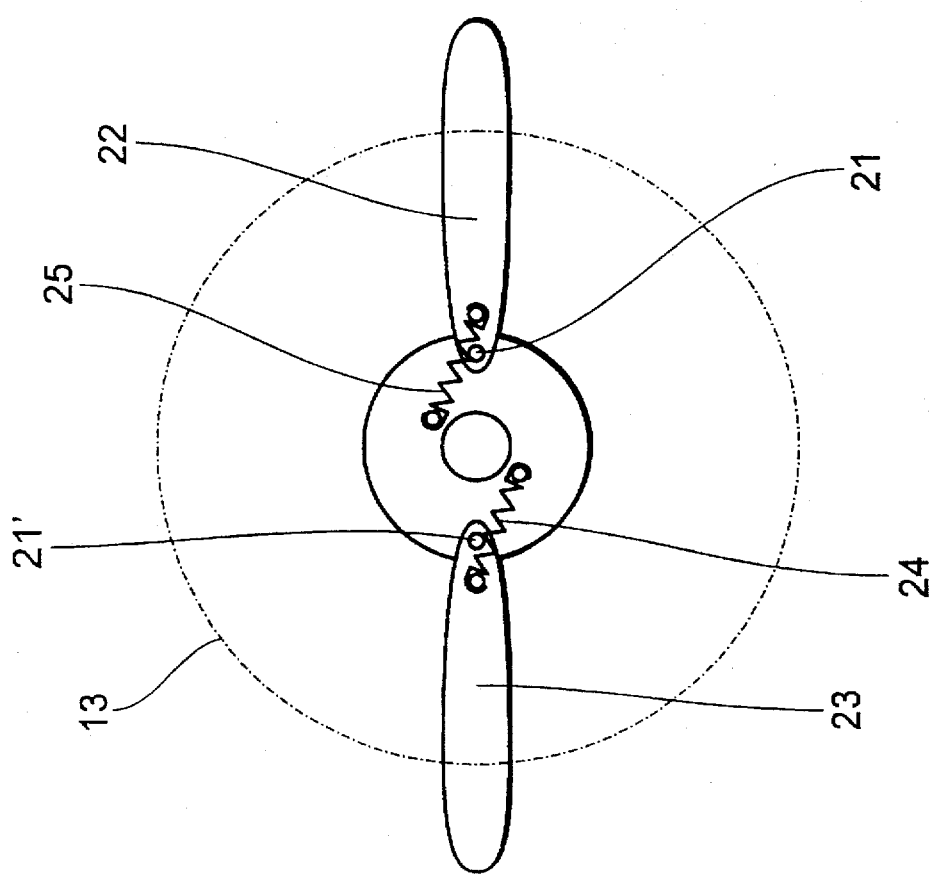

The propulsion means and the controls for changing the propulsion are to be explained by way of FIG. 3. (The components not followed by a reference numeral were already explained by way of the previously illustrated figures and do not need to be specified in greater detail.) The engine 2 is connected to a gear 16 via a shaft 14 via a pinion 15, with an inner toothed wheel 17 having external toothing being connected via a coupling to a hub 19 of the smaller (first) propeller 12 which is provided with blades that are rotatable around axes 21 and 21'. When the coupling 18 is activated, the blades arrive at the (illustrated) operating position (see also FIG. 4) as a result of the centrifugal force acting against the return action of springs. The resting position i.e. folded position, of the blades is shown in FIG. 5 from which it can be seen that the blades do not rise above a cross section of the fuselage 3 or engine pod in a region where the fuselage and engine pod adjoin one another. The fuselage nose is displaceable via a control element 26 and hides the blades 22 and 23 disposed in their resting position. In the operating condition, blades 22 and 23 project through a closable gap G (see FIG. 3) which extends in a transverse direction over the circumference of fuselage 3.

By actuating the coupling 27, the large (second) propeller 11 is connected to the propulsion system via an outer toothed wheel 28 having internal toothing via the toothed wheel 15. During this process, the blades 29 and 30 are guided into a position for forward thrust. When the coupling 27 is disengaged, the blades, however, are in feathered pitch and are fixed in place in a horizontally oriented position, as is shown in FIG. 2. The pitch and power of propeller 11 is designed for operation in thin air strata at the aircraft's cruising speed, while the propeller 12 is optimized for takeoff and flight near to the ground. The two couplings 18 and 27 are activated alternatingly so that both propellers 11 and 12 respectively have the full engine power at their disposal. Preferably, the two propellers 11 and 12 are operated counter to one another so that, also in case that both propellers are operated simultaneously over a short period of time, the moments that occur do not become inadmissibly large. The speed of the second propeller may be geared down by an intermediate gear comprising, for example, a planetary gear.

In an alternative embodiment (which is not illustrated), the propellers 11 and 12 oriented in tailward direction may also act as pusher propellers. Likewise, an aircraft may be correspondingly provided with several engines in separate engine pods which are preferably configured in the region of the wing.

The invention is not limited in its implementation to the preferred embodiment indicated above. Rather, a number of variants are conceivable which make use of the above-described solution, even if the embodiments are fundamentally different in type.

I claim:

1. In an aircraft having at least one drive motor coupled to first and second propellers for forward thrust of the aircraft, the improvement wherein:

the first propeller is dimensioned for takeoff and landing conditions and for flight conditions below a predetermined first flight altitude and includes blades that are foldable or collapsible so that their maximum extension, starting from their rotary axis, is smaller in a resting position than their corresponding maximum extension in an operating position; and the second propeller has a radius which is larger than a radius of the first propeller and is dimensioned for a second flight altitude which is substantially greater than the first flight altitude; and further including means for alternatingly coupling the two propellers with the at least one drive motor so that the two propellers are respectively individually adapted to the power of the at least one drive motor for a full utilization of the power of the at least one drive motor for forward thrust.

2. The aircraft according to claim 1, wherein the aircraft is a fixed wing aircraft.

3. The aircraft according to claim 1, wherein at least one of the first and second propellers has dual blades.

4. The aircraft according to claim 1, wherein the aircraft includes a landing gear having ground contact points defining a plane and the second propeller presents a disk during operation that intersects the plane defined by the ground contact points of the landing gear.

5. The aircraft according to claim 1, wherein the second propeller has blades that are held in a horizontal position while fixed in place in a feathered pitch.

6. The aircraft according to claim 1, wherein the first propeller is located forward of the second propeller relative to a direction of flight.

7. The aircraft according to claim 1, wherein the first and second propellers have coaxial axes of rotation.

8. The aircraft according to claim 1, and further including an intermediate gear for gearing down a speed of the second propeller.

9. The aircraft according to claim 8, wherein the intermediate gear comprises a planetary gear.

10. The aircraft according to claim 1, wherein the aircraft has a fuselage and an adjoining engine pod, and the first propeller has blades that are swingable around swing axes disposed in proximity of a rotational drive axis of the at least one drive motion so that, in a resting position, the blades of the first propeller do not rise above a cross section of the fuselage and the engine pod in a region where the engine pod adjoins tile fuselage.

11. The aircraft according to claim 10, wherein the swing axes are oriented parallel to the rotational drive axis.

12. The aircraft according to claim 10, further including springs connected for holding the blades of the first propeller in a resting position.

13. The aircraft according to claim 1, wherein the aircraft has a fuselage and the first propeller has blades which, in an operating condition, project through a closable gap extending in a transverse direction over a circumference of the fuselage.

14. The aircraft according to claim 13, further including a nose or tail fairing disposed for closing the closable gap and being displaceable in or opposite to a flight direction of the aircraft.

* * * * *